US011080460B2

(12) United States Patent
Pu et al.

(10) Patent No.: US 11,080,460 B2
(45) Date of Patent: Aug. 3, 2021

(54) METHOD OF MODELING HIGH SPEED CHANNEL IN SEMICONDUCTOR PACKAGE, METHOD OF DESIGNING SEMICONDUCTOR PACKAGE USING THE SAME AND METHOD OF MANUFACTURING SEMICONDUCTOR PACKAGE USING THE SAME

(71) Applicant: Samsung Electronics Co., Ltd., Suwon-si (KR)

(72) Inventors: Bo Pu, Suwon-si (KR); Jun So Pak, Seongnam-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/986,760

(22) Filed: Aug. 6, 2020

(65) Prior Publication Data

US 2021/0110096 A1    Apr. 15, 2021

(30) Foreign Application Priority Data

Oct. 14, 2019  (KR) .......................... 10-2019-0126791
Feb. 4, 2020   (KR) .......................... 10-2020-0012968

(51) Int. Cl.
*G06F 30/398*   (2020.01)
*G06F 30/367*   (2020.01)
*G06F 30/3323*  (2020.01)
*G06F 119/10*   (2020.01)

(52) U.S. Cl.
CPC ........ *G06F 30/398* (2020.01); *G06F 30/3323* (2020.01); *G06F 30/367* (2020.01); *G06F 2119/10* (2020.01)

(58) Field of Classification Search
USPC ....................................................... 716/115
See application file for complete search history.

(56) References Cited

U.S. PATENT DOCUMENTS

| | | | |
|---|---|---|---|
| 6,643,831 B2 | 11/2003 | Chang et al. |
| 7,895,540 B2 | 2/2011 | Engin et al. |
| 8,352,232 B2 | 1/2013 | Han et al. |
| 8,572,537 B2 | 10/2013 | Su et al. |
| 8,793,637 B2 | 7/2014 | Gordin et al. |
| 8,856,710 B2 | 10/2014 | Yeh et al. |
| 9,021,412 B2 | 4/2015 | Wu et al. |
| 9,275,182 B2 | 3/2016 | Sproch et al. |

(Continued)

*Primary Examiner* — Mohammed Alam
(74) *Attorney, Agent, or Firm* — Myers Bigel, P.A.

(57) ABSTRACT

A method of modeling a high speed channel in a semiconductor package, the high speed channel including a plurality of first connection wirings on an upper surface of a semiconductor substrate and a plurality of through electrodes penetrating the semiconductor substrate, includes: receiving design information of the high speed channel, dividing the design information into a first layout including the plurality of first connection wirings and a second layout including the plurality of through electrodes; performing a first modeling operation on the first layout using a first modeling scheme and a first modeling tool; performing a second modeling operation on the second layout using a second modeling scheme, a second modeling tool, and at least a portion of the first layout; and obtaining an integrated modeling result of an entirety of the high speed channel by combining results of the first and second modeling operations.

20 Claims, 13 Drawing Sheets

(56) References Cited

U.S. PATENT DOCUMENTS

| | | |
|---|---|---|
| 9,886,542 B2 | 2/2018 | Han et al. |
| 2005/0160382 A1* | 7/2005 | Wang .................... G06F 30/367 |
| | | 716/115 |
| 2006/0091550 A1* | 5/2006 | Shimazaki .......... G06F 30/3312 |
| | | 257/758 |
| 2008/0052651 A1* | 2/2008 | Wang .................. G06F 30/3312 |
| | | 716/113 |
| 2010/0332193 A1* | 12/2010 | Hu ........................ G06F 30/367 |
| | | 703/1 |

* cited by examiner $$\begin{bmatrix} V_{21} \\ V_{22} \\ \vdots \\ V_{2n} \end{bmatrix} = \begin{bmatrix} S_{11} & S_{12} & \cdots & S_{1m} \\ S_{21} & S_{22} & \cdots & S_{2m} \\ \vdots & \vdots & & \vdots \\ S_{n1} & S_{n2} & \cdots & S_{nm} \end{bmatrix} \begin{bmatrix} V_{11} \\ V_{12} \\ \vdots \\ V_{1m} \end{bmatrix}$$

where the left vector is $V2$, the middle matrix is $S$, and the right vector is $V1$.

METHOD OF MODELING HIGH SPEED CHANNEL IN SEMICONDUCTOR PACKAGE, METHOD OF DESIGNING SEMICONDUCTOR PACKAGE USING THE SAME AND METHOD OF MANUFACTURING SEMICONDUCTOR PACKAGE USING THE SAME

CROSS-REFERENCE TO RELATED APPLICATIONS

This application claims priority under 35 USC § 119 to Korean Patent Application No. 10-2019-0126791, filed on Oct. 14, 2019, and Korean Patent Application No. 10-2020-0012968, filed on Feb. 4, 2020, in the Korean Intellectual Property Office (KIPO), the contents of each of which are herein incorporated by reference in their entirety.

BACKGROUND

1. Technical Field

The present disclosure relates generally to semiconductor integrated circuits, and more particularly to methods of modeling high speed channels in semiconductor packages, methods of designing semiconductor packages using the methods of modeling the high speed channels, and methods of manufacturing semiconductor packages using the methods of designing the semiconductor packages.

2. Description of the Related Art

Recently, it has become desirable to increase a memory bandwidth for high performance computing (HPC), such as an artificial intelligence (AI) and a graphic processing unit (GPU), since the accelerator design for machine learning may be impacted by whether or not the system may become computation bound and/or memory bandwidth bound.

The increase of the memory bandwidth may involve the innovation of process technology. Developments in process technology have resulted in higher density in integrated circuits (ICs). A three-dimensional (3D) integration may make it possible to continue enlarging the density of ICs. In addition, a 2.5D interposer and through silicon vias (TSVs) are also playing a significant role. The increasing bandwidth requirement in HPC has resulted in a 2.5D silicon interposer becoming an important solution owing to its large number of fine channels and consequently greater channel bandwidth. Therefore, an accurate modeling of the high speed channel in 2.5D and/or 3D ICs by an interposer and TSVs may be useful.

SUMMARY

At least one example embodiment of the present disclosure provides a method of efficiently modeling a high speed channel that is formed by TSVs and metal wirings in a semiconductor package implemented in 2.5D and/or 3D structures.

At least one example embodiment of the present disclosure provides a method of designing a semiconductor package using the method of modeling the high speed channel.

At least one example embodiment of the present disclosure provides a method of manufacturing a semiconductor package using the method of designing the semiconductor package.

According to example embodiments, in a method of modeling a high speed channel in a semiconductor package, the high speed channel is formed by a plurality of first connection wirings on an upper surface of a semiconductor substrate and a plurality of through electrodes penetrating the semiconductor substrate. Design information of the high speed channel is received. The design information is divided into a first layout including the plurality of first connection wirings and a second layout including the plurality of through electrodes. A first modeling operation is performed on the first layout using a first modeling scheme and a first modeling tool. A second modeling operation is performed on the second layout using a second modeling scheme, a second modeling tool and at least a portion of the first layout. The second modeling scheme is different from the first modeling scheme, and the second modeling tool is different from the first modeling tool. An integrated modeling result of an entire of the high speed channel is obtained by combining a result of the first modeling operation and a result of the second modeling operation.

According to example embodiments, in a method of designing a semiconductor package, a design of at least one semiconductor device that is included in the semiconductor package is generated. A design of a high speed channel that is included in the semiconductor package is generated. The high speed channel is modeled. A result of the modeling of the high speed channel is analyzed and verified. The high speed channel is formed by a plurality of first connection wirings on an upper surface of a semiconductor substrate and a plurality of through electrodes penetrating the semiconductor substrate. Modeling the high speed channel includes receiving design information of the high speed channel, dividing the design information into a first layout including the plurality of first connection wirings and a second layout including the plurality of through electrodes, performing a first modeling operation on the first layout using a first modeling scheme and a first modeling tool, performing a second modeling operation on the second layout using a second modeling scheme, a second modeling tool, and at least a portion of the first layout, where the second modeling scheme is different from the first modeling scheme and the second modeling tool is different from the first modeling tool, and obtaining an integrated modeling result of an entirety of the high speed channel by combining a result of the first modeling operation and a result of the second modeling operation.

According to example embodiments, in a method of manufacturing a semiconductor package, a design of a semiconductor package including at least one semiconductor device and a high speed channel is generated. The semiconductor package is fabricated based on a result of designing the semiconductor package. Designing the semiconductor package includes generating a design of the at least one semiconductor device, generating a design of the high speed channel, modeling the high speed channel, and analyzing and verifying a result of modeling of the high speed channel. The high speed channel includes a plurality of first connection wirings on an upper surface of a semiconductor substrate and a plurality of through electrodes penetrating the semiconductor substrate. Modeling the high speed channel includes receiving design information of the high speed channel, dividing the design information into a first layout including the plurality of first connection wirings and a second layout including the plurality of through electrodes, performing a first modeling operation on the first layout using a first modeling scheme and a first modeling tool, performing a second modeling operation on the second layout using a second modeling scheme, a second modeling tool, and at least a portion of the first layout, where the second modeling scheme is different from the first modeling scheme, and the second modeling tool is different from the first modeling tool, and obtaining an integrated modeling result of an entirety of the high speed channel by combining a result of the first modeling operation and a result of the second modeling operation.

In the method of modeling the high speed channel in the semiconductor package, the method of designing the semiconductor package and the method of manufacturing the semiconductor package according to example embodiments, the parameter extraction scheme using the on-chip tool and the full wave 3D electromagnetic scheme using the off-chip tool may be combined, merged or integrated, and thus a model for the high speed channel in the semiconductor package may be accurately and efficiently obtained. In addition, the material and structure of the connection wirings may be changed in the full wave 3D electromagnetic scheme using the off-chip tool, and thus the accuracy of the model may be maintained while the amount of calculation is reduced.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
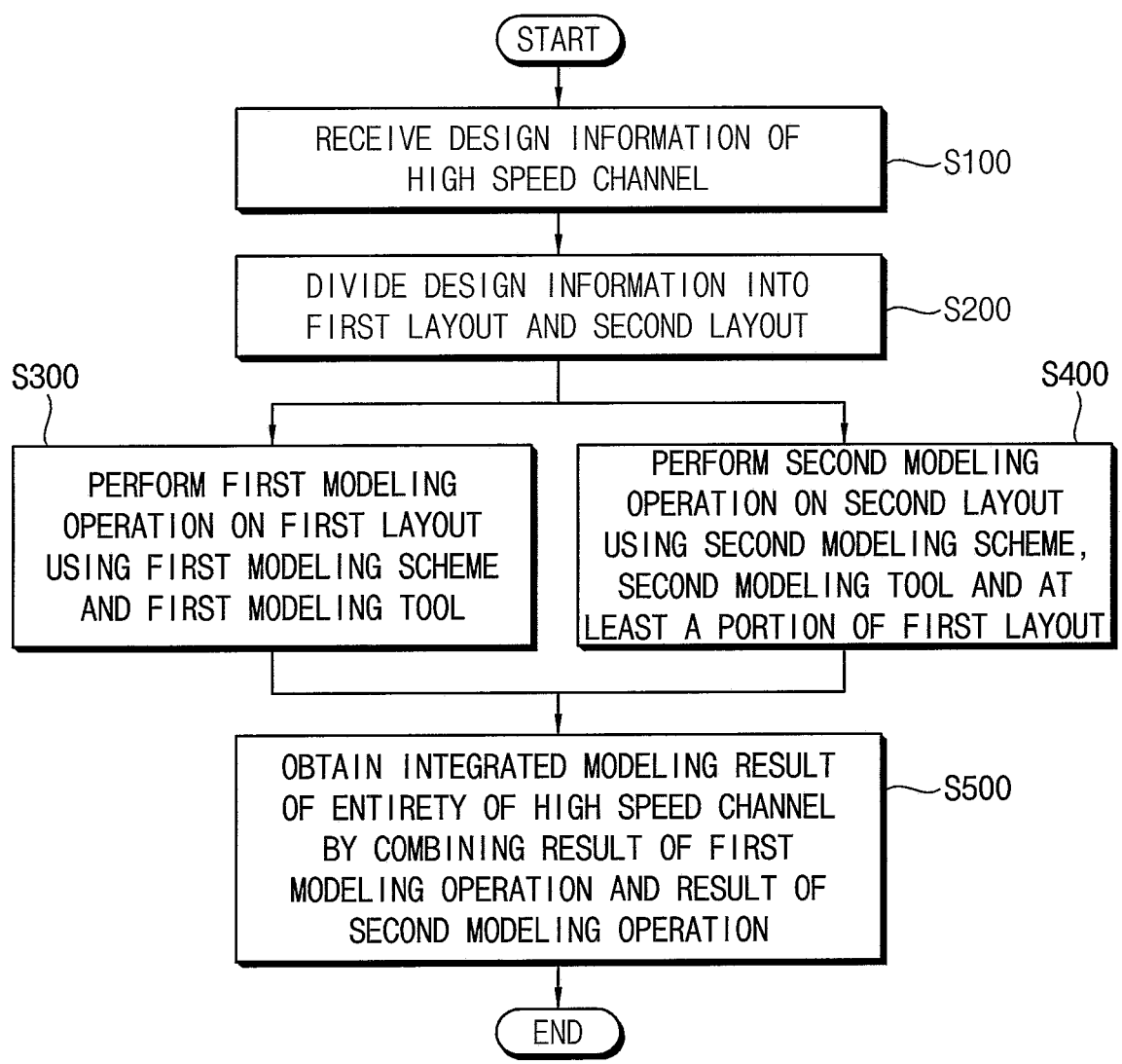
FIG. 1 is a flowchart illustrating a method of modeling a high speed channel in a semiconductor package according to example embodiments of the inventive concepts.

Various example embodiments of the inventive concepts will be described more fully with reference to the accompanying drawings, in which embodiments of the inventive concepts are shown. The present disclosure may, however, be embodied in many different forms and should not be construed as limited to the embodiments set forth herein. Like reference numerals refer to like elements throughout this application.

FIG. 1 is a flowchart illustrating a method of modeling a high speed channel in a semiconductor package according to example embodiments.

Referring to FIG. 1, example embodiments may be used to model a high speed channel included in a semiconductor package. The high speed channel may be formed or implemented by a plurality of first connection wirings on an upper surface of a semiconductor substrate included in the semiconductor package and a plurality of through electrodes penetrating the semiconductor substrate. Detailed configurations of the semiconductor package and the high speed channel will be described with reference to FIGS. 2, 3 and 10.

In the method of modeling the high speed channel in the semiconductor package according to example embodiments of the inventive concepts, design information of the high speed channel is received (step S100). For example, the design information may be provided in the form of a graphic database system (GDS) file.

As will be described with reference to FIG. 12, when designing the semiconductor package, at least one semiconductor device included in the semiconductor package may be designed, and then the high speed channel for semiconductor devices in the semiconductor package to communicate with each other and/or for the semiconductor devices in the semiconductor package and external circuits to communicate with each other may be designed. After that, the GDS file may be received as a result of designing the high speed channel.

The design information may be divided into a first layout including the plurality of first connection wirings and a second layout including the plurality of through electrodes (step S200). For example, the first layout may be obtained by extracting a layout of a first wiring layer that includes the plurality of first connection wirings on the upper surface of the semiconductor substrate from the GDS file, and the second layout may be obtained by extracting a layout of the plurality of through electrodes in the semiconductor substrate other than the first wiring layer from the GDS file.

In some example embodiments, as will be described with reference to FIGS. 2 and 3, the semiconductor package may further include a plurality of second connection wirings on a lower surface of the semiconductor substrate and a plurality of solder bumps under the plurality of second connection wirings. In this example, the second layout may include the plurality of through electrodes, the plurality of second connection wirings and the plurality of solder bumps. In other words, the second layout may be obtained by extracting layouts of the plurality of through electrodes, the plurality of second connection wirings, and the plurality of solder bumps other than the first wiring layer from the GDS file.

A first modeling operation may be performed on the first layout using a first modeling scheme and a first modeling tool (step S300). For example, the first modeling tool may be an on-chip tool, and the first modeling scheme may be a parameter extraction (PEX) scheme using the on-chip tool. For example, the on-chip tool may be the StarRC program from Synopsys, Inc. However, example embodiments are not limited thereto, and the on-chip tool may be one of various programs (e.g., software) for calculating resistances. Step S300 will be described in detail with reference to FIG. 4.

A second modeling operation may be performed on the second layout using a second modeling scheme, a second modeling tool, and at least a portion of the first layout (step S400). The second modeling scheme may be different from the first modeling scheme, and the second modeling tool may be different from the first modeling tool. For example, the second modeling tool may be an off-chip tool, and the second modeling scheme may be a full wave three-dimensional (3D) electromagnetic (EM) scheme using the off-chip tool. For example, the off-chip tool may be a High Frequency Electromagnetic Field Simulation Software (HFSS) from ANSYS Inc. However, example embodiments are not limited thereto, and the off-chip tool may be one of various programs for solving Maxwell's equations in 3D.

In some example embodiments, when performing the full wave 3D electromagnetic scheme using the off-chip tool in step S400, only at least some of the plurality of first connection wirings included in the first layout may be used for reducing the amount of calculation (or computation), and a material and a structure (e.g., shape) of the at least some of the plurality of first connection wirings may also be changed. Step S400 will be described in detail with reference to FIGS. 5 and 6.

Although FIG. 1 illustrates that steps S300 and S400 are substantially simultaneously or concurrently performed, example embodiments are not limited thereto, and one of steps S300 and S400 may be performed first and the other of steps S300 and S400 may be performed later.

An integrated modeling result of the entirety of the high speed channel is obtained by combining a result of the first modeling operation and a result of the second modeling operation (step S500). Step S500 will be described in detail with reference to FIG. 8.

In the method of modeling the high speed channel in the semiconductor package according to example embodiments, the parameter extraction scheme using the on-chip tool and the full wave 3D electromagnetic scheme using the off-chip tool may be combined, merged or integrated, and thus a model for the high speed channel in the semiconductor package may be accurately and efficiently obtained. In addition, the material and structure of the connection wirings may be changed in the full wave 3D electromagnetic scheme using the off-chip tool, and thus the accuracy of the model may be maintained while the amount of calculation is reduced. By increasing an accuracy of the model, the performance of the resulting semiconductor package that is manufactured may be improved. In addition, by reducing the amount of calculations, the computational resources required to design and/or manufacture the semiconductor package may be reduced. Thus, the embodiments of the inventive concepts described herein provide a technical improvement both to the technological equipment used to design and/or manufacture a semiconductor package and to the semiconductor packages that are designed and/or manufactured utilizing the embodiments of the inventive concepts described herein.

Figure 2:
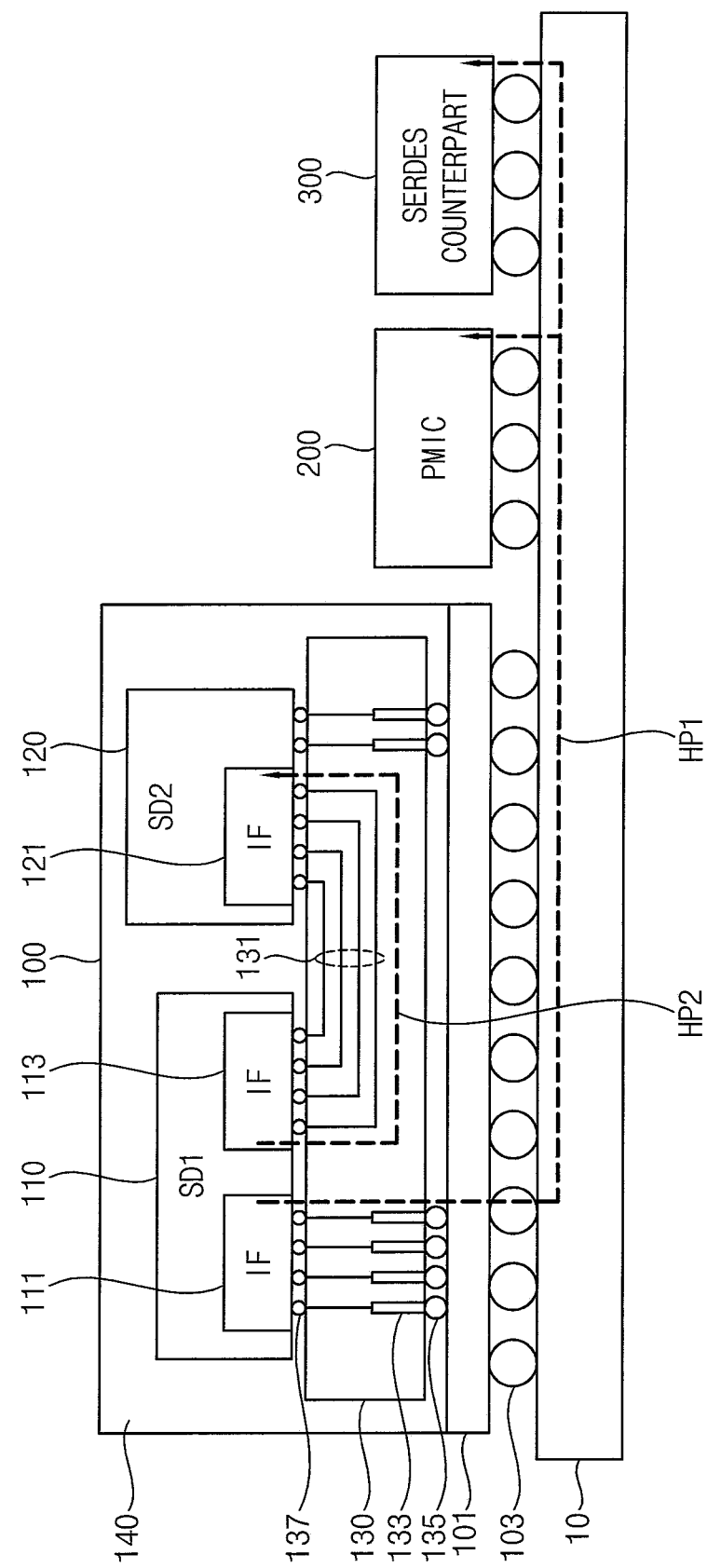
FIG. 2 is a cross-sectional view of an example of a semiconductor package implemented by a method of modeling a high speed channel according to example embodiments of the inventive concepts.

FIG. 2 is a cross-sectional view of an example of a semiconductor package implemented by a method of modeling a high speed channel according to example embodiments.

Referring to FIG. 2, a semiconductor package 100 may include a package substrate 101, a first semiconductor device (SD1) 110, a second semiconductor device (SD2) 120 and an interposer 130. The semiconductor package 100 may further include a sealing member 140.

The semiconductor package 100 may be a memory package having a stacked chip structure in which a plurality of dies (or chips) are stacked. For example, the semiconductor package 100 may be implemented in a 2.5D structure, and may include a semiconductor device and a memory device with a 2.5D chip structure. For example, the first semiconductor device 110 may include a logic semiconductor device, and the second semiconductor device 120 may include a memory device. For example, the logic semiconductor device may operate as a host, and may include a central processing unit (CPU), a GPU, a system-on-chip (SoC), an application specific integrated circuit (ASIC), or the like. For example, the memory device may include a high bandwidth memory (HBM) device.

The package substrate 100 may have an upper surface and a lower surface that are opposite to each other. For example, the package substrate 100 may be a printed circuit board (PCB). The PCB may be a multilayered circuit board including vias and various circuits therein.

The interposer 130 may be disposed on the package substrate 101. The interposer 130 may be mounted on the package substrate 101 by solder bumps 135. For example, the solder bumps 135 may be C4 bumps. For example, a planar area of the interposer 130 may be less than a planar area of the package substrate 101. In other words, the interposer 130 may be disposed within the area of the package substrate 101 in a plan view.

The interposer 130 may include a plurality of connection wirings 131 and a plurality of through electrodes 133 therein. For example, the interposer 130 may be a silicon interposer including a silicon substrate that is a semiconductor substrate, and the plurality of through electrodes 133 may be through silicon vias (TSVs) penetrating the silicon substrate. The semiconductor substrate (e.g., the silicon substrate), the plurality of connection wirings 131, and the plurality of through electrodes (e.g., the TSVs) 133 may correspond to the semiconductor substrate, the plurality of first connection wirings, and the plurality of through electrodes, respectively, that are included in the semiconductor package described with reference to FIG. 1.

The first semiconductor device 110 and the second semiconductor device 120 may be connected to each other through the plurality of connection wirings 131 and/or may be electrically connected to the package substrate 101 through the plurality of through electrodes (e.g., the TSVs) 133 and the solder bumps (e.g., the C4 bumps) 135. The interposer 130 (e.g., a silicon interposer) may provide a high density interconnection between the first and second semiconductor devices 110 and 120.

The first semiconductor device 110 and the second semiconductor device 120 may be disposed on the interposer 130. The first semiconductor device 110 and the second semiconductor device 120 may be mounted on the interposer 130 by a flip chip bonding scheme. For example, the first semiconductor device 110 and the second semiconductor device 120 may be mounted on the interposer 130 such that active surfaces of the first semiconductor device 110 and the second semiconductor device 120 on which chip pads are disposed face the interposer 130. The chip pads of the first semiconductor device 110 and the second semiconductor device 120 may be electrically connected to connection pads of the interposer 130 by solder bumps 137 that are conductive bumps. For example, the solder bumps 137 may be uBumps.

Although FIG. 2 illustrates that the semiconductor package 100 includes one first semiconductor device 110 and one second semiconductor device 120, example embodiments are not limited thereto. For example, the second semiconductor device 120 may include a buffer die and a plurality of memory dies (or chips) stacked on the buffer die. The buffer die and the plurality of memory dies may be electrically connected to each other by TSVs.

The first semiconductor device 110, the second semiconductor device 120 and the interposer 130 may be fixed by the sealing member 140.

In some example embodiments, although not illustrated in FIG. 2, the semiconductor package 100 may further include a first adhesive that is underfilled between the interposer 130 and the package substrate 101, a second adhesive that is underfilled between the first semiconductor device 110 and the interposer 130, and/or a third adhesive that is underfilled between the second semiconductor device 120 and the interposer 130. For example, the first, second and third adhesives may include an epoxy material to reinforce a gap between the interposer 130 and the package substrate 101 and/or a gap between the interposer 130 and each of the first and second semiconductor devices 110 and 120.

External connection pads may be disposed on the lower surface of the package substrate 101, and external connectors 103 for an electrical connection with an external device may be disposed on the external connection pads. For example, the external connectors 103 may be solder balls (e.g., ball grid arrays (BGAs)). The semiconductor package 100 may be mounted on a module substrate 10 by the external connectors 103, thus constituting a memory module.

In addition to the semiconductor package 100, a power management integrated circuit (PMIC) 200, a serializer & deserializer (SERDES) counterpart circuit 300, and the like may be additionally mounted on the module substrate 10. The PMIC 200 may manage and/or control power supplied to the semiconductor package 100. The SERDES counterpart circuit 300 may perform a serial communication with the semiconductor package 100.

The first semiconductor device 110 may include an interface (IF) 111 for communicating with the outside of the semiconductor package 100. For example, the interface 111 may include at least one of various serial interfaces. A first high speed path HP1 for communicating with the PMIC 200 and/or the SERDES counterpart circuit 300 outside the semiconductor package 100 may be formed or implemented by the interface 111, the through electrodes 133 (e.g., the TSVs) in the interposer 130, the solder bumps 135 (e.g., the C4 bumps), and connection wirings in the package substrate 101 and the module substrate 10. For example, the first high speed path HP1 may be referred to as a high speed serial input/output (I/O) path.

The first semiconductor device 110 may include an interface 113 for communicating with the second semiconductor device 120, and the second semiconductor device 120 may include an interface 121 for communicating with the first semiconductor device 110. For example, each of the interfaces 113 and 121 may include a HBM PHY unit for a memory interface. A second high speed path HP2 may be formed or implemented in the semiconductor package 100 by the interfaces 113 and 121 and the connection wirings 131 in the interposer 130. For example, the second high speed path HP2 may be referred to as a high speed memory I/O path.

The first high speed path HP1 (e.g., the high speed serial I/O path) and the second high speed path HP2 (e.g., the high speed memory I/O path) described above may form a high speed channel of the semiconductor package 100.

When the semiconductor package 100 is implemented in a 2.5D structure as illustrated in FIG. 2, the high speed channel including the first high speed path HP1 and the second high speed path HP2 may be formed by the interposer 130. Thus, the method of modeling the high speed channel for designing the semiconductor package 100 of FIG. 2 may be described as a method of modeling an interposer.

Figure 3:
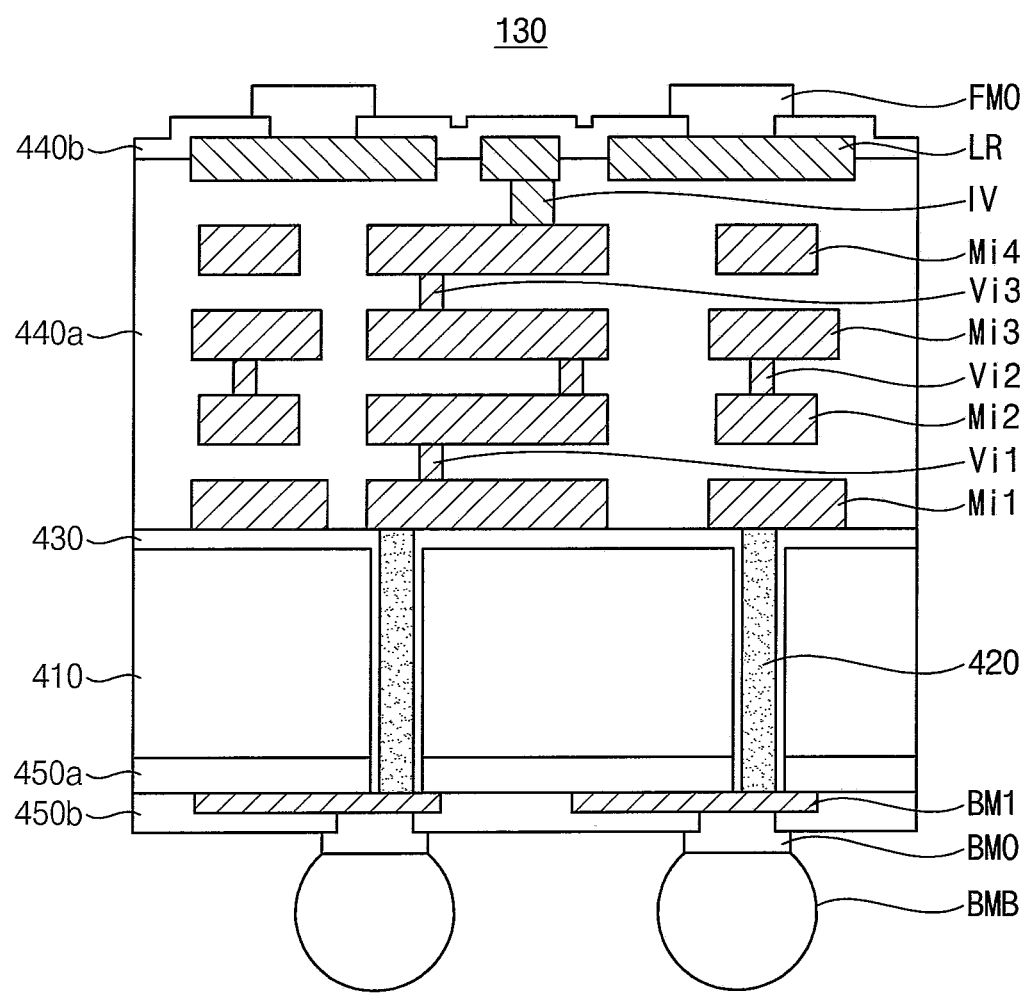
FIG. 3 is a cross-sectional view of an example of an interposer included in the semiconductor package of FIG. 2.

FIG. 3 is a cross-sectional view of an example of an interposer 130 included in the semiconductor package of FIG. 2.

Referring to FIGS. 2 and 3, the interposer 130 may include a semiconductor substrate 410 and a first wiring layer on an upper surface of the semiconductor substrate 410. The interposer 130 may further include a second wiring layer on a lower surface of the semiconductor substrate 410 and solder bumps BMB under the second wiring layer.

Typically, when the interposer 130 is manufactured or fabricated, configurations associated with or related to the semiconductor substrate 410 may be manufactured first in the front end of the process, and then configurations associated with or related to the first wiring layer may be manufactured later in the back end of the process. Thus, a structure including the semiconductor substrate 410 may be referred to as a front end of line (FEOL) part, and a structure including the first wiring layer may be referred to as a back end of line (BEOL) part.

The first wiring layer may include a plurality of connection wirings LR, Mi1, Mi2, Mi3, and Mi4, and a plurality of vias IV, Vi1, Vi2, and/or Vi3 for connecting the plurality of connection wirings LR, Mi1, Mi2, Mi3, and/or Mi4 with each other. The plurality of connection wirings Mi1, Mi2, Mi3, and Mi4 may correspond to the plurality of connection wirings 131 in FIG. 2.

The first wiring layer may further include insulation layers 440a and 440b for an electrical insulation between the plurality of connection wirings LR, Mi1, Mi2, Mi3, and Mi4. Openings FMO for exposing the connection wirings LR may be formed on the uppermost portion of the first wiring layer. Although not illustrated in FIG. 3, the solder bumps 137 (e.g., the uBumps) in FIG. 2 may be formed on the openings FMO.

In some example embodiments, the connection wirings LR and the via IV may include a first metal (e.g., aluminum (Al)), and the connection wirings Mi1, Mi2, Mi3, and Mi4 and the vias Vi1, Vi2, and Vi3 may include a second metal (e.g., copper (Cu)) different from the first metal. The connection wirings LR, Mi1, Mi2, Mi3, and Mi4 may be formed on the upper surface of the semiconductor substrate 410, and thus may be referred to as front metals.

The semiconductor substrate 410 may include a plurality of through electrodes (e.g., TSVs) 420 penetrating therethrough. For example, the semiconductor substrate 410 may be a silicon substrate. The plurality of through electrodes 420 may correspond to the plurality of through electrodes 133 in FIG. 2.

An insulation layer 430 for an electrical insulation may be formed between the semiconductor substrate 410 and the first wiring layer, and between the semiconductor substrate 410 and the plurality of through electrodes 420. For example, the insulation layer 430 may include silicon oxide (e.g., $SiO_2$).

The second wiring layer may include a first passivation layer 450a, connection wirings BM1, and a second passivation layer 450b that are sequentially formed on the lower surface of the semiconductor substrate 410. For example, the first and second passivation layers 450a and 450b may include an insulating material. The connection wirings BM1 may be formed on the lower surface of the semiconductor substrate 410, and thus may be referred to as back metals. Openings BMO for exposing the connection wirings BM1 and forming the solder bumps BMB may be formed under the second passivation layer 450b. The solder bumps BMB may correspond to the solder bumps 135 (e.g., the C4 bumps) in FIG. 2.

To model the high speed channel in the semiconductor package 100 to have desired and/or intended signal characteristics (e.g., signal integrity), the characteristics of the connection wirings Mi1, Mi2, Mi3, and Mi4 included in the first wiring layer (e.g., the BEOL part) may be modeled, and the characteristics of the through electrodes (e.g., the TSVs) 420 in the semiconductor substrate 410 and the connection wirings BM1 and the solder bumps BMB under the semiconductor substrate 410 may also be modeled. However, as will be described with reference to FIG. 7A, the size (or area) of the through electrodes 420 is much larger than that of other components, and thus it may be difficult to model all of the components described above at once using a conventional modeling scheme. In addition, since the conventional modeling method may regard or consider the semiconductor substrate 410 around the through electrodes 420 as a ground node, the conventional modeling method may not able to extract the coupling between the through electrodes 420 by (or through) the semiconductor substrate 410. The coupling between the through electrodes 420 by the semiconductor substrate 410 may dominate the accuracy of the model in GHz frequency range. The coupling between the through electrodes 420 by the semiconductor substrate 410 may be significant to the most of high speed signals which propagate with a few gigabits per second (Gbps) and with corresponding Nyquist frequencies at GHz area, and thus such coupling must be considered to model the high speed channel. In the method of modeling the high speed channel in the semiconductor package 100 according to example embodiments, the parameter extraction scheme using the on-chip tool and the full wave 3D electromagnetic scheme using the off-chip tool may be combined, merged and/or integrated, and thus the high speed channel in the semiconductor package 100 may be accurately and efficiently modeled.

Figure 4:
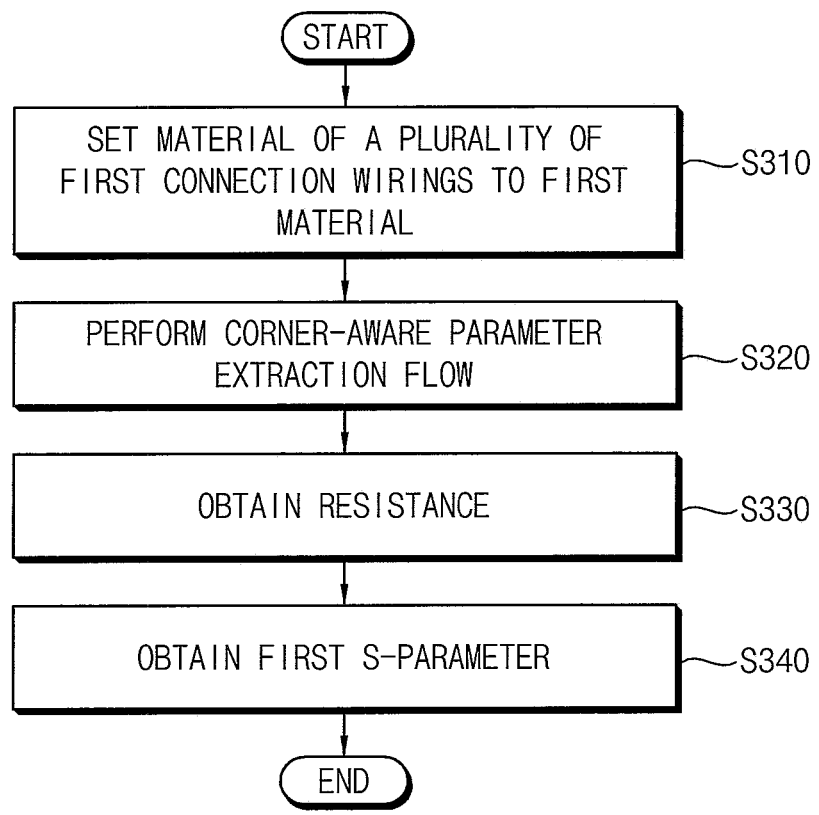
FIG. 4 is a flowchart illustrating an example of performing a first modeling operation on a first layout in FIG. 1.

FIG. 4 is a flowchart illustrating an example of performing a first modeling operation on a first layout in FIG. 1.

Referring to FIGS. 1, 3 and 4, when performing the first modeling operation on the first layout (step S300), a material of the plurality of first connection wirings may be set to a first material (step S310). For example, a material of all of the connection wirings Mi1, Mi2, Mi3, and Mi4 included in the first wiring layer (e.g., the BEOL part) of FIG. 3 may be set to the first material. For example, the first material may be copper. The material condition may be uniquely and distinctively set by step S310.

A corner-aware parameter extraction flow may be performed based on the plurality of first connection wirings set to the first material and a structure of the plurality of first connection wirings (step S320), and a resistance of the plurality of first connection wirings (e.g., a resistance of the first wiring layer) may be obtained as a result of the corner-aware parameter extraction flow (step S330). For example, a corner-aware flow, scheme, or process may represent that a specific predetermined condition is set to be associated with the characteristics of the connection wirings Mi1, Mi2, Mi3, and Mi4. A corner-aware model for the first wiring layer (e.g., the BEOL part) may be generated by step S320. For example, the resistance obtained by step S330 may be obtained in the form of a schematic circuit diagram (e.g., a sub-circuit in a Simulation Program with Integrated Circuit Emphasis (SPICE) type and/or format).

A first S-parameter for the plurality of first connection wirings (e.g., an S-parameter for the first wiring layer) may be obtained based on the resistance obtained by step S330 (step S340). An S-parameter is one of various parameters representing channel characteristics, and will be described with reference to FIG. 9.

In some example embodiments, the first S-parameter may be obtained by converting the resistance obtained by step S330 using an additional tool different from the first modeling tool and the second modeling tool. As described above, the on-chip tool may not directly output the S-parameter, but may output the resistance in the form of the schematic circuit diagram. Thus, the resistance obtained by step S330 may be converted using the additional tool (e.g., a circuit simulation tool) different from the on-chip tool to obtain the first S-parameter.

The parameter extraction scheme using the on-chip tool may efficiently generate the corner-aware model for the first wiring layer (e.g., the BEOL part). However, since the corner-aware parameter extraction flow regards the semiconductor substrate 410 around the through electrodes (e.g., the TSVs) 420 as a ground node (e.g., since the corner-aware parameter extraction flow is not able to not handle the semiconductor substrate 410), the coupling between the through electrodes 420 through the semiconductor substrate 410 may not be extracted, a capacitance occurring in the insulation layer 430 between the connection wirings Mi1 and the semiconductor substrate 410 may not be considered or available, and thus the characteristics of the through electrodes 420 may not be accurately determined, detected, or recognized. Accordingly, as will be described with reference to FIG. 5, the through electrodes (e.g., the TSVs) 420 may be modeled using a different scheme other than the parameter extraction scheme.

Figure 5:
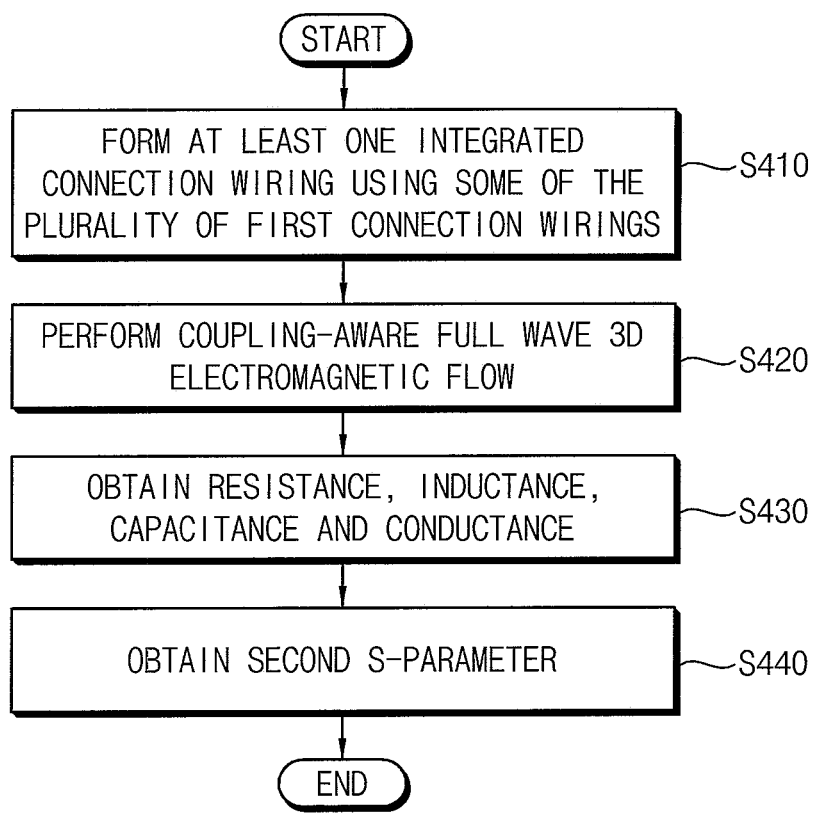
FIG. 5 is a flowchart illustrating an example of performing a second modeling operation on a second layout in FIG. 1.

FIG. 5 is a flowchart illustrating an example of performing a second modeling operation on a second layout in FIG. 1.

Referring to FIGS. 1, 3 and 5, when performing the second modeling operation on the second layout (step S400), at least one integrated connection wiring may be formed using some (e.g., a subset) of the plurality of first connection wirings (step S410). For example, a material and a structure (e.g., shape) of at least some of the plurality of first connection wirings may be changed to obtain the at least one integrated connection wiring.

Figure 6:
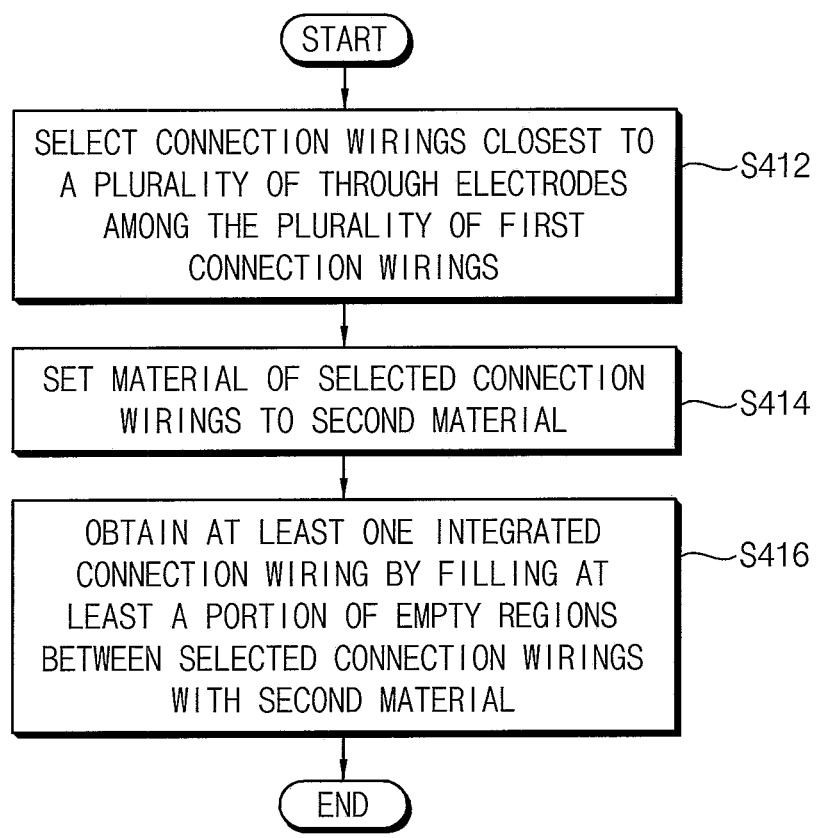
FIG. 6 is a flowchart illustrating an example of forming at least one integrated connection wiring in FIG. 5.

FIG. 6 is a flowchart illustrating an example of forming at least one integrated connection wiring in FIG. 5. FIGS. 7A, 7B, 7C, and 7D are diagrams for describing an operation of FIG. 6. For convenience of illustration, only connection wirings and through electrodes (e.g., TSVs) are illustrated in FIGS. 7A, 7B, 7C, and 7D.

Referring to FIGS. 5, 6, 7A, 7B, 7C and 7D, when forming the at least one integrated connection wiring (step S410), connection wirings closest to the plurality of through electrodes may be selected among and/or from the plurality of first connection wirings (step S412). For example, among the connection wirings Mi1, Mi2, Mi3, and Mi4 included in the first wiring layer (e.g., the BEOL part) of FIG. 3, the connection wirings Mi1 closest to the through electrodes 420 (e.g., the TSVs) may be selected.

A material of the selected connection wirings may be set to a second material different from the first material (step S414). For example, the second material may be a perfect conductor (PEC) which has a resistance of about zero. As with step S310, the material condition may be uniquely and distinctively set by step S414. In particular, the repetitive extraction for the resistance of the connection wirings Mi1 may be avoided by setting the material of the connection wirings Mi1 to a material having a resistance of about zero.

The at least one integrated connection wiring may be obtained by filling at least a portion of empty regions between the selected connection wirings with the second material (e.g., replacing the at least a portion of the empty regions with the second material in the layout) and/or by combining or merging at least some of the selected connection wirings (step S416). As illustrated in FIGS. 7B, 7C and 7D, the at least one integrated connection wiring may be a solid, united, or combined connection wiring.

Figure 7A:
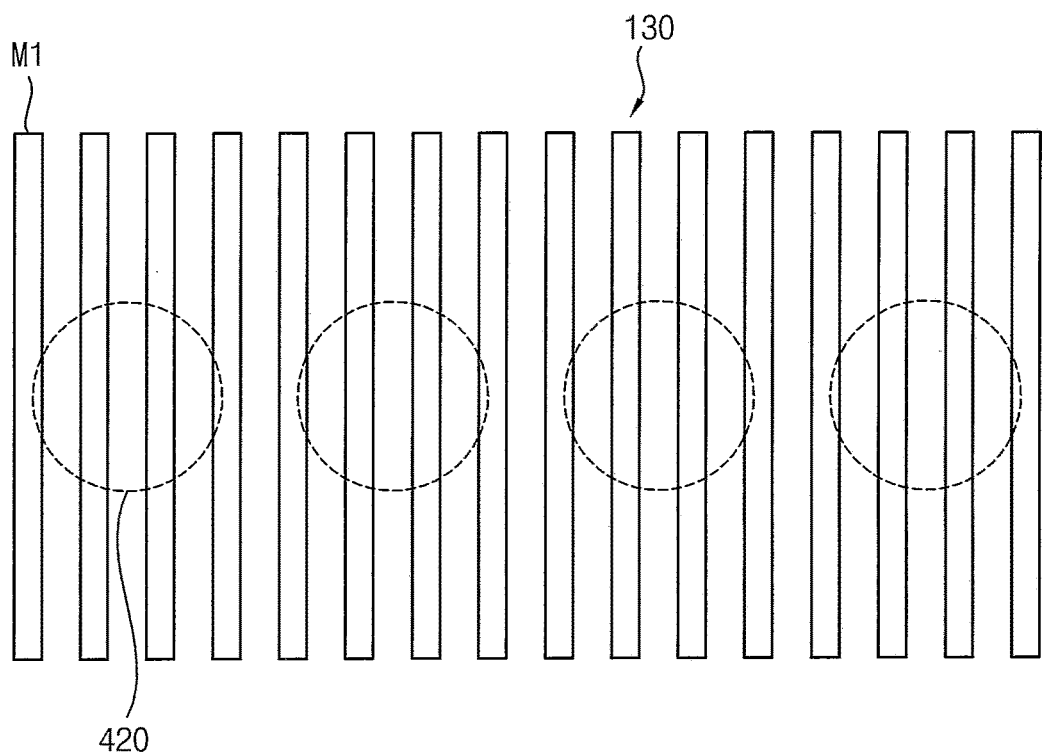
FIGS. 7A, 7B, 7C and 7D are diagrams for describing an operation of FIG. 6.
Figure 7B:
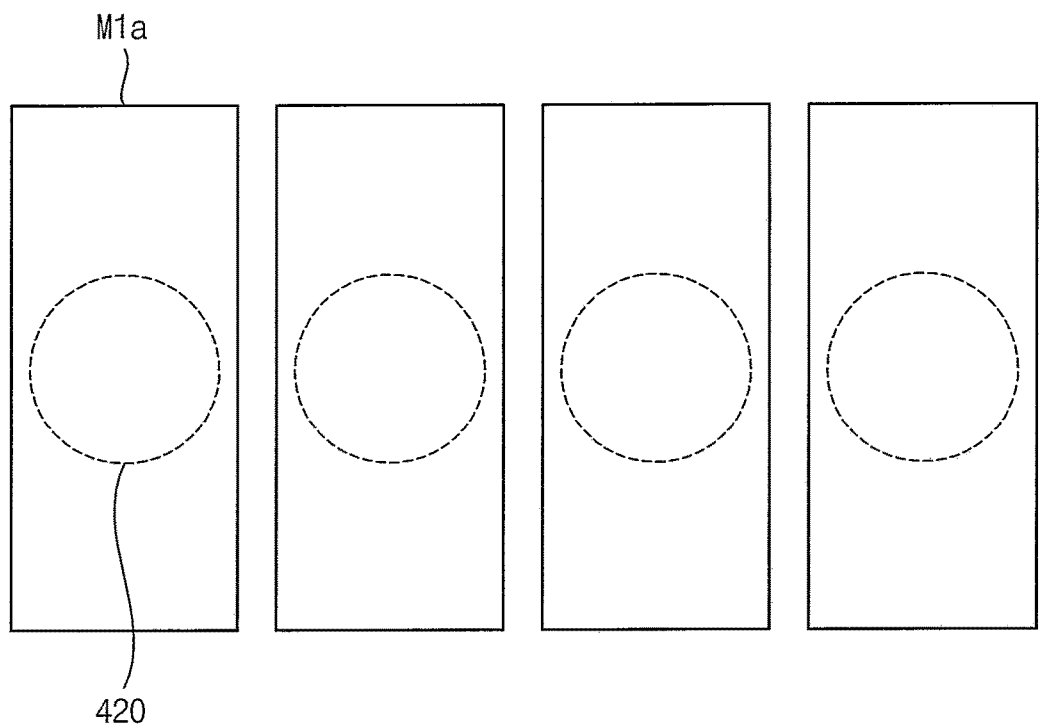
Figure 7C:
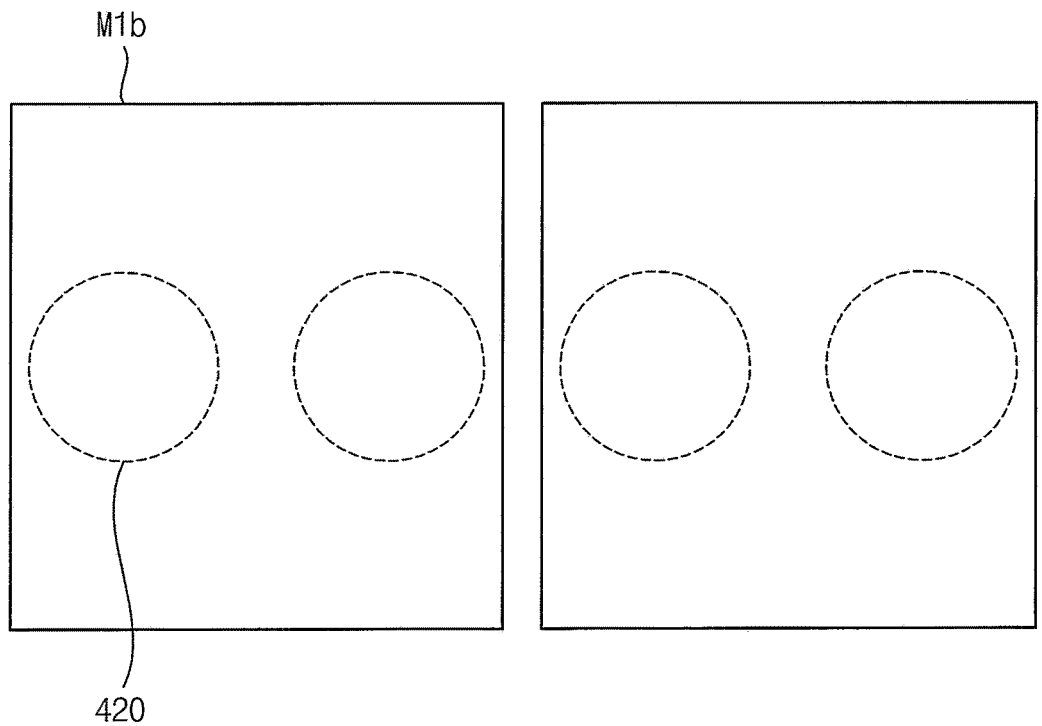
Figure 7D:
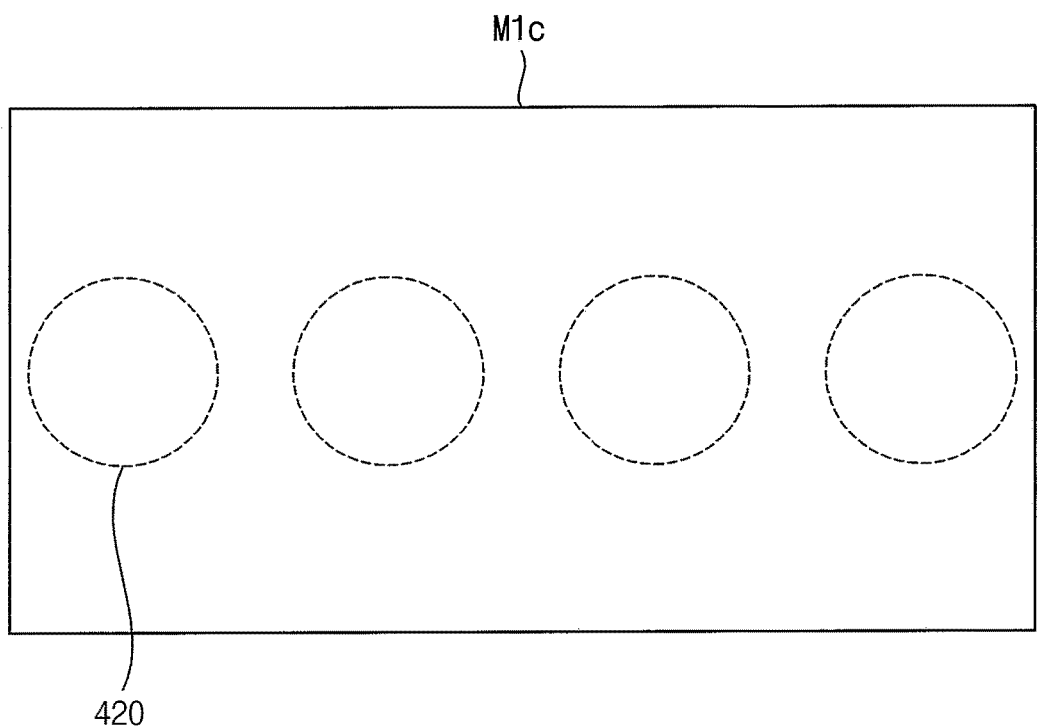

For example, as illustrated in FIG. 7A, when the actual implemented or manufactured interposer 130 is observed at a top view or plan view, a size (e.g., diameter) of each of the through electrodes 420 (e.g., TSVs) may be much larger than a size (e.g., width) of each of connection wirings M1, and one through electrode 420 may overlap several connection wirings M1. In other words, one through electrode 420 may overlap two or more of the selected connection wirings. In some embodiments, the connection wirings M1 may correspond to the connection wirings Mi1 in FIG. 3.

As illustrated in FIGS. 7B, 7C and 7D, at least a portion of empty regions between the connection wirings M1 in FIG. 7A may be filled (or at least some of the connection wirings M1 in FIG. 7A may be combined) to form integrated connection wirings M1a, M1b, and/or M1c from ones of the connection wirings M1.

In some example embodiments, as illustrated in FIG. 7B, the at least one integrated connection wiring may be formed or implemented such that one through electrode 420 overlaps one integrated connection wiring M1a.

In other example embodiments, as illustrated in FIGS. 7C and 7D, the at least one integrated connection wiring may be formed or implemented such that two or more of the plurality of through electrodes 420 overlap one integrated connection wiring M1b or M1c. In an example of FIG. 7C, two through electrodes 420 may overlap one integrated connection wire M1b. In an example of FIG. 7D, more than two and/or all (e.g., four) through electrodes 420 may overlap one integrated connection wiring M1c.

As described with reference to FIGS. 7B, 7C and 7D, when using a solid plane along the outline of the mesh grid pattern in the connection wirings M1 instead of the real mesh grid pattern in the connection wirings M1, the amount of calculation may be reduced with little error, compared with a case of using all the connection wirings Mi1, Mi2, Mi3, and Mi4. Therefore, the subsequent calculations or operations may be performed by considering only the integrated connection wiring M1a, M1b, or M1c without considering all the connection wirings Mi1, Mi2, Mi3, and Mi4.

Referring again to FIGS. 1, 3 and 5, a coupling-aware full wave 3D electromagnetic flow may be performed based on the at least one integrated connection wiring (e.g., M1a, M1b, and/or M1c) set to the second material and a structure of the plurality of through electrodes (step S420), and a resistance, an inductance, a capacitance, and a conductance of the at least one integrated connection wiring (e.g., M1a, M1b, and/or M1c) and the plurality of through electrodes (e.g., TSVs) may be obtained as a result of the coupling-aware full wave 3D electromagnetic flow (step S430). For example, the through electrodes may be TSVs, and thus the coupling-aware full wave 3D electromagnetic flow may be a TSV coupling-aware full wave 3D electromagnetic based flow. As described above, the TSV aware flow may be performed by considering only the integrated connection wiring M1a, M1b, and/or M1c without considering all the connection wirings Mi1, Mi2, Mi3, and Mi4.

A second S-parameter for the plurality of through electrodes may be obtained based on the resistance, the inductance, the capacitance, and the conductance obtained by step S430 (step S440).

In some example embodiments, the second S-parameter may be obtained directly from the second modeling tool without using an additional tool. In other words, the second S-parameter may be obtained directly from the 3D simulation performed by the off-chip tool without any additional tool.

In some example embodiments, as described with reference to FIG. 3, the second layout may further include a plurality of second connection wirings (e.g., the connection wirings BM1) on a lower surface of the semiconductor substrate and a plurality of solder bumps (e.g., the solder bumps BMB) under the plurality of second connection wirings. In this example, the coupling-aware full wave 3D electromagnetic flow may be performed in step S420 by applying structures of the plurality of second connection wirings and the plurality of solder bumps together (e.g., analyzing the structures of the plurality of second connection wirings and the plurality of solder bumps together in combination). As such, the resistance, the inductance, the capacitance and the conductance obtained by step S430 may be a resistance, an inductance, a capacitance and a conductance of the at least one integrated connection wiring, the plurality of through electrodes, the plurality of second connection wirings and the plurality of solder bumps, and the second S-parameter obtained by step S440 may be an S-parameter for the plurality of through electrodes, the plurality of second connection wirings, and the plurality of solder bumps.

The full wave 3D electromagnetic scheme using the off-chip tool may avoid and/or reduce the problem caused by the parameter extraction scheme using the on-chip tool, and may obtain very high accuracy for the coupling associated with the through electrodes 420 (e.g., TSVs). However, in the full wave 3D electromagnetic scheme, the corner-aware parameter extraction may not be possible, the modeling of the first wiring layer (e.g., the BEOL part) may be difficult, the time and memory requirements to process the first wiring layer may be very large, and thus the turn-around time (TAT) may not be satisfied.

In the method of modeling the high speed channel in the semiconductor package according to example embodiments, the parameter extraction scheme using the on-chip tool and the full wave 3D electromagnetic scheme using the off-chip tool may be combined, merged, or integrated. The corner-aware parameter extraction may be efficiently performed on the BEOL part based on the parameter extraction scheme, and the coupling-aware parameter extraction may be efficiently performed on the TSVs based on the full wave 3D electromagnetic scheme, and thus the model for the high speed channel in the semiconductor package may be accurately and efficiently obtained by combining the two modeling results. In addition, the material and structure of the connection wirings may be changed in the full wave 3D electromagnetic scheme using the off-chip tool, and thus the accuracy of the model may be maintained while the amount of calculation is reduced.

Figures 8, 9:
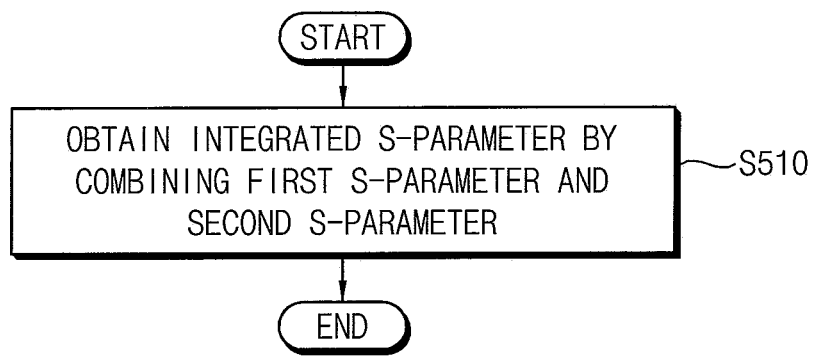
FIG. 8 is a flowchart illustrating an example of obtaining an integrated modeling result of the entirety of a high speed channel in FIG. 1.
FIG. 9 is a diagram illustrating an example of an S-parameter obtained by a method of modeling a high speed channel according to example embodiments of the inventive concepts.

FIG. 8 is a flowchart illustrating an example of obtaining an integrated modeling result of the entirety of a high speed channel in FIG. 1.

Referring to FIGS. 1 and 8, when obtaining the integrated modeling result of the entirety of the high speed channel (step S500), an integrated S-parameter may be obtained by combining the first S-parameter (e.g., from step S340 of FIG. 4) and the second S-parameter (e.g., from step S440 of FIG. 5) (step S510). The integrated S-parameters may represent an S-parameter for the entirety of the high speed channel.

FIG. 9 is a diagram illustrating an example of an S-parameter obtained by a method of modeling a high speed channel according to example embodiments of the inventive concepts.

Referring to FIG. 9, an S-parameter S may be denoted by an n*m matrix that includes elements $S_{11}, S_{12}, \ldots, S_{1m}, S_{21}, S_{22}, \ldots, S_{2m}, \ldots, S_{n1}, S_{n2}, \ldots, S_{nm}$, where each of n and m is a natural number greater than or equal to two. A channel output V2 that includes elements $V_{21}, V_{22}, \ldots, V_{2n}$ may be obtained by multiplying a channel input V1 that includes elements $V_{11}, V_{12}, \ldots, V_{1m}$ and the S-parameter S. Thus, the S-parameter S may represent the channel characteristics.

Figure 10:
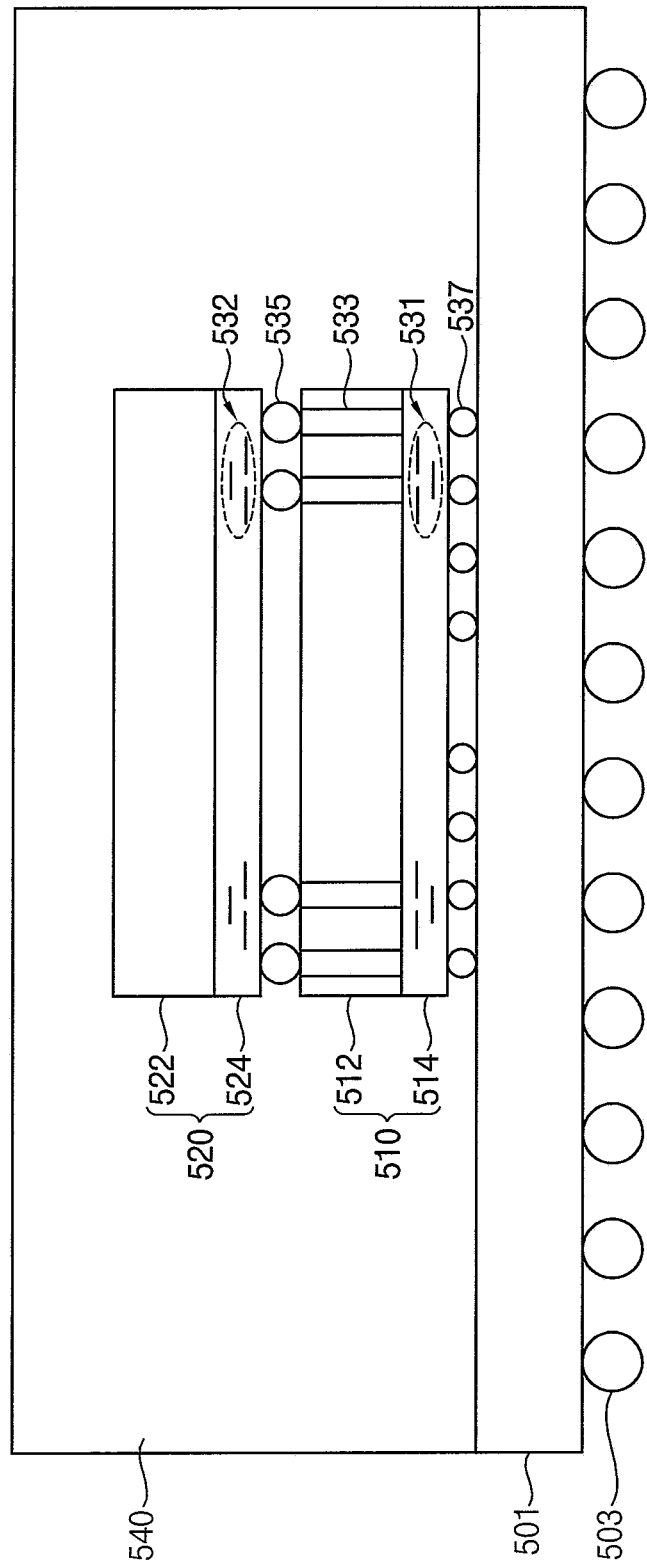
FIG. 10 is a cross-sectional view of another example of a semiconductor package implemented by a method of modeling a high speed channel according to example embodiments of the inventive concepts.

FIG. 10 is a cross-sectional view of another example of a semiconductor package implemented by a method of modeling a high speed channel according to example embodiments of the inventive concepts. The descriptions of elements that are the same or similar to those of FIG. 2 will be omitted.

Referring to FIG. 10, a semiconductor package 500 includes a package substrate 501, a first semiconductor device 510, and a second semiconductor device 520. The semiconductor package 500 may further include a sealing member 540.

The semiconductor package 500 of FIG. 10 may be similar to the semiconductor package 100 of FIG. 2, except that the interposer 130 in FIG. 2 is omitted, the first and second semiconductor devices 510 and 520 may be stacked in the vertical direction, and through electrodes and connection wirings may be included in the first and second semiconductor devices 510 and 520, rather than in an interposer.

The semiconductor package 500 may be a memory package having a stacked chip structure in which a plurality of dies (or chips) are stacked. For example, the semiconductor package 500 may be implemented in a 3D structure, and may include a semiconductor device and a memory device with a 3D chip structure. For example, the first semiconductor device 510 may include a logic semiconductor device, and the second semiconductor device 520 may include a memory device.

The package substrate 501, external connectors 503 and the sealing member 540 may be substantially the same as the package substrate 101, external connectors 103 and the sealing member 140 in FIG. 1, respectively.

The first semiconductor device 510 may be disposed on the package substrate 501. The first semiconductor device 510 may be mounted on the package substrate 501 by a flip chip bonding scheme. For example, the first semiconductor device 510 may be mounted on the package substrate 501 such that an active surface of the first semiconductor device 510 on which chip pads are disposed faces the package substrate 501. The chip pads of the first semiconductor device 510 may be electrically connected to connection pads of the package substrate 501 by solder bumps (e.g., uBumps) 537 that are conductive bumps.

The first semiconductor device 510 may include a semiconductor substrate 512 and a wiring layer 514. The semiconductor substrate 512 may include a circuit structure (not illustrated) such as a transistor, and may include a plurality of through electrodes (e.g., TSVs) 533 penetrating therethrough. Although not illustrated in detail, the wiring layer 514 may include a plurality of connection wiring 531 and a plurality of vias.

The second semiconductor device 520 may be disposed on the first semiconductor device 510. The second semiconductor device 520 may be mounted on the first semiconductor device 510 by a flip chip bonding scheme. For example, the second semiconductor device 520 may be mounted on the first semiconductor device 510 such that an active surface of the second semiconductor device 520 on which chip pads are disposed faces the first semiconductor device 510. The chip pads of the second semiconductor device 520 may be electrically connected to the plurality of through electrodes (e.g., the TSVs) 533 of the first semiconductor device 510 by solder bumps (e.g., C4 bumps) 535 that are conductive bumps.

The second semiconductor device 520 may include a semiconductor substrate 522 and a wiring layer 524. The semiconductor substrate 522 may include a circuit structure (not illustrated) such as a transistor. Although not illustrated in detail, the wiring layer 524 may include a plurality of connection wiring 532 and a plurality of vias.

Although FIG. 10 illustrates that the semiconductor package 500 includes one first semiconductor device 510 and one second semiconductor device 520, example embodiments are not limited thereto. For example, at least one other second semiconductor device may be stacked on the second semiconductor device 520. In some embodiments, as with the first semiconductor device 510, the semiconductor substrate 522 of the second semiconductor device 520 may include through electrodes.

In the semiconductor package 500 of FIG. 10, the through electrodes 533 and the solder bumps 535 may correspond to the through electrodes 133 and the solder bumps 135 included in the interposer 130 of FIG. 2, respectively, and the connection wirings 531 and 532 in the wiring layers 514 and 524 may correspond to the connection wirings 131 and 524 included in the interposer 130 of FIG. 2. Accordingly, a model for the high speed channel in the semiconductor package 500 of FIG. 10 may be accurately and efficiently obtained by performing the method of modeling the high speed channel according to example embodiments.

Figure 11:
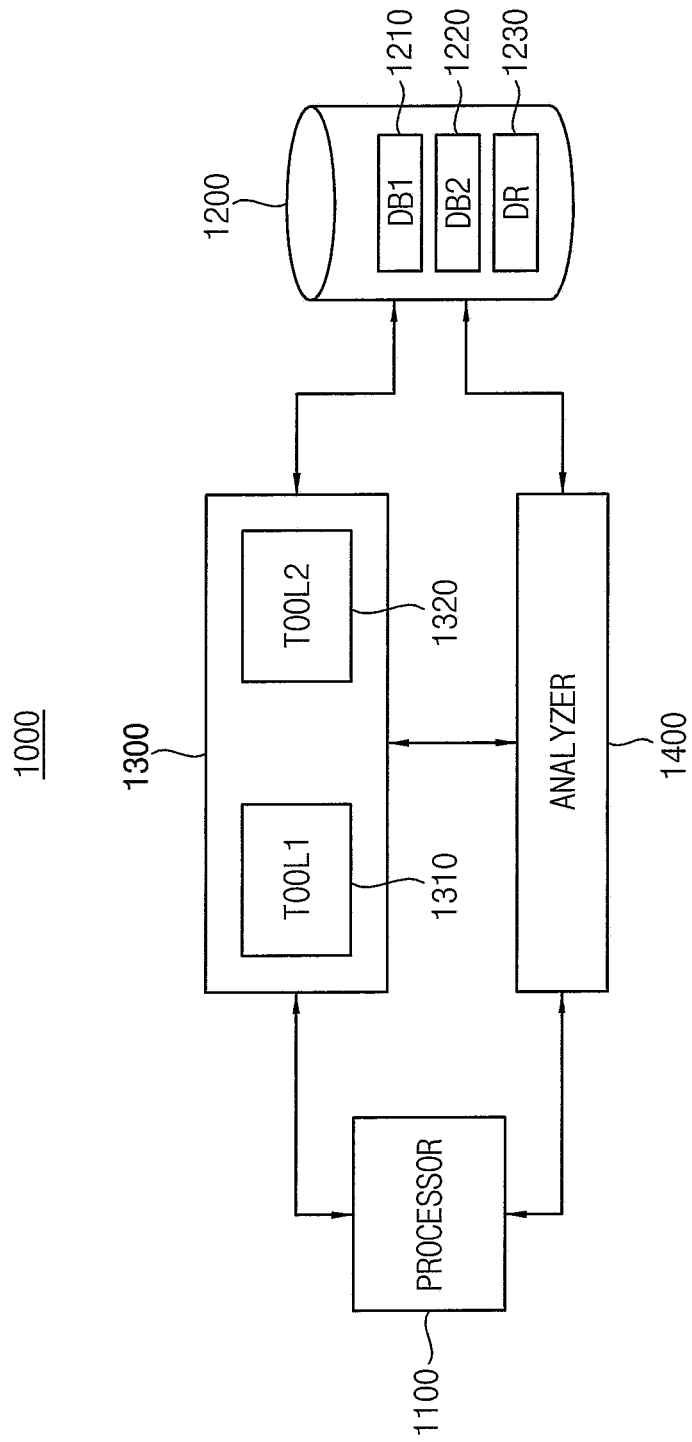
FIG. 11 is a block diagram illustrating a modeling and designing system for a semiconductor package according to example embodiments of the inventive concepts.

FIG. 11 is a block diagram illustrating a modeling and designing system for a semiconductor package according to example embodiments.

Referring to FIG. 11, a modeling and designing system 1000 for a semiconductor package includes a processor 1100, a storage device 1200, a modeling and designing module 1300, and an analyzer (or analyzing module) 1400.

As used herein, the term "module" may indicate, but is not limited to, a software and/or hardware component, such as a field programmable gate array (FPGA) or an application specific integrated circuit (ASIC), which performs certain tasks. A module may be configured to reside in a tangible addressable storage medium and be configured to execute on one or more processors. For example, a "module" may include components such as software components, object-oriented software components, class components and task components, and processes, functions, routines, segments of program code, drivers, firmware, microcode, circuitry, data, databases, data structures, tables, arrays, and variables. A "module" may be divided into a plurality of "modules" that perform detailed functions.

The processor 1100 may be used when the modeling and designing module 1300 and/or the analyzer 1400 performs a computation. For example, the processor 1100 may include a microprocessor, an application processor (AP), a digital signal processor (DSP), a GPU, or the like. In FIG. 11, only one processor 1100 is illustrated, but example embodiments are not limited thereto. For example, a plurality of processors may be included in the modeling and designing system 1000. In addition, the processor 1100 may include cache memories to increase computation capacity.

The storage device 1200 may include a first database (DB1) 1210 for a first modeling tool 1310 and a second database (DB2) 1220 for a second modeling tool 1320, and may further include a design rule (DR) 1230. The first database 1210, the second database 1220 and the design rule 1230 may be provided from the storage device 1200 to the modeling and designing module 1300 and/or the analyzer 1400. The design rule 1230 may provide a set of guidelines for constructing various masks needed in fabrication of the integrated circuit. For example, the design rule 1230 may include minimum width and minimum spacing requirements between cells on a same layer and/or between cells on different layers. Further, the design rule 1230 may include minimum line widths of routing wires.

In some example embodiments, the storage device or storage medium 1200 may include any non-transitory computer-readable storage medium used to provide commands and/or data to a computer. For example, the non-transitory computer-readable storage medium 1200 may include volatile memory such as random access memory (RAM), read only memory (ROM), etc. and/or nonvolatile memory such as flash memory, magnetoresistive RAM (MRAM), phase-change RAM (PRAM), resistive RAM (RRAM), etc. The non-transitory computer-readable storage medium 1200 may be inserted into the computer, may be integrated in the computer, or may be coupled to the computer through a communication medium such as a network and/or a wireless link.

The modeling and designing module 1300 may include the first modeling tool 1310 and the second modeling tool 1320. The first modeling tool 1310 may perform the first modeling operation on the BEOL part using the first modeling scheme, as described with reference to step S300 in FIG. 1 and steps S310 through S340 in FIG. 4. The second modeling tool 1320 may perform the second modeling operation on the TSVs, the lower wirings, and the solder bumps other than the BEOL part using the second modeling scheme, as described with reference to step S400 in FIG. 1, steps S410 through S440 in FIG. 5, and steps S412 through S416 in FIG. 6.

The analyzer 1400 may analyze and verify a result of the modeling operations performed by the modeling and designing module 1300. When it is determined based on a result of the analysis that the channel characteristic satisfies a predetermined signal characteristic, the modeling and designing module 1300 may output data and/or a signal indicating that the modeling operations are successful. When it is determined based on the result of the analysis that the channel characteristic does not satisfy the predetermined signal characteristic, the channel structure may be changed by modifying or adjusting the channel design and/or chip design, and the analysis and verification may be performed again.

The modeling and designing module 1300 and/or the analyzer 1400 may be implemented in software, but example embodiments are not limited thereto. When both the modeling and designing module 1300 and the analyzer 1400 are implemented in software, the modeling and designing module 1300 and the analyzer 1400 may be stored in the form of codes in the storage device 1200, or may be stored in the form of code in another storage device (not illustrated) separate from the storage device 1200.

Figure 12:
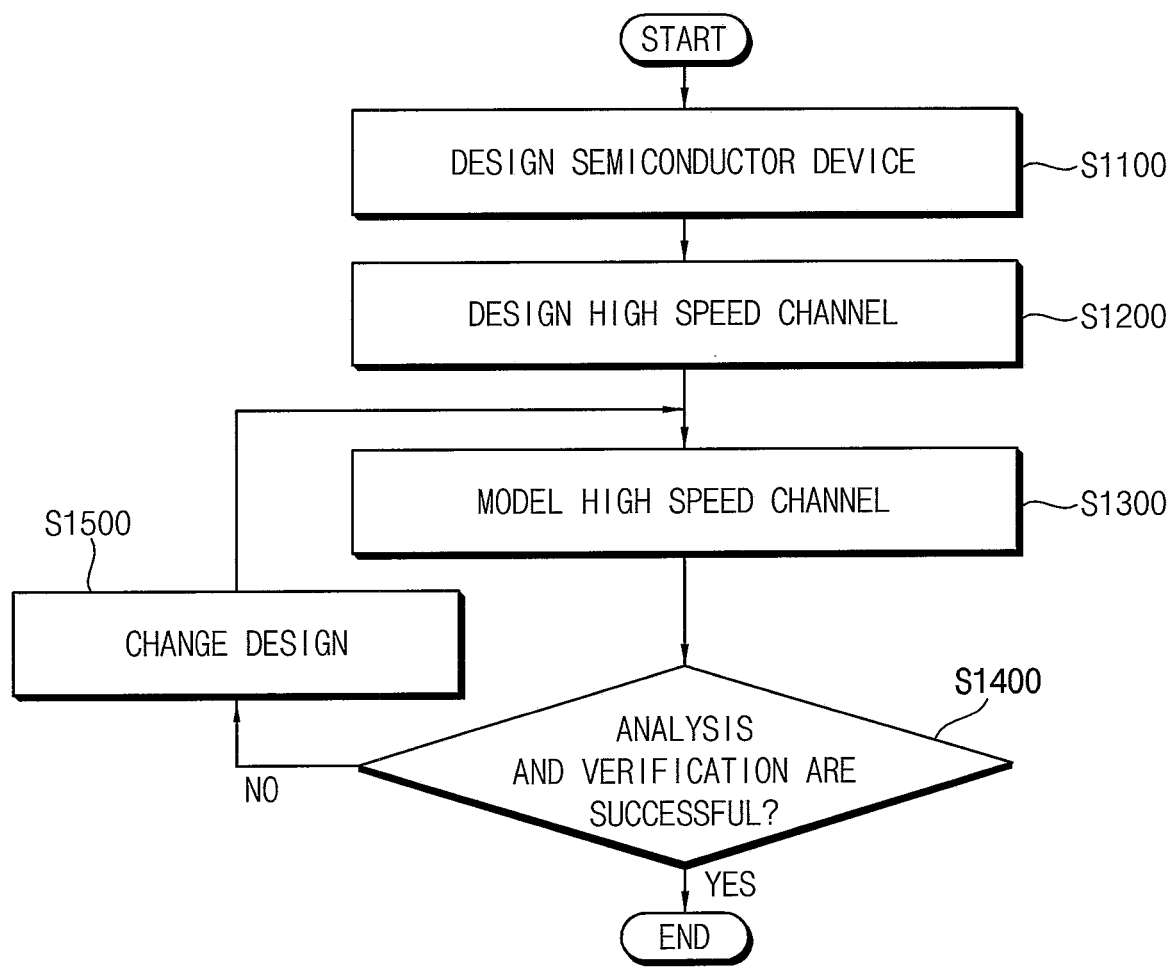
FIG. 12 is a flowchart illustrating a method of designing a semiconductor package according to example embodiments of the inventive concepts.

FIG. 12 is a flowchart illustrating a method of designing a semiconductor package according to example embodiments of the inventive concepts.

Referring to FIG. 12, in a method of designing a semiconductor package according to example embodiments, at least one semiconductor device included in the semiconductor package is designed (step S1100), and a high speed channel included in the semiconductor package is designed (step S1200). For example, the first and second semiconductor devices (e.g., the logic semiconductor device and the memory device) described with reference to FIGS. 2 and 10 may be designed, and then the first and second high speed paths (e.g., the high speed serial I/O path and the high speed memory I/O path) described with reference to FIGS. 2 and 10 may be designed.

In some example embodiments, when the semiconductor package has the 2.5D structure such as the semiconductor package 100 of FIG. 2, step S1100 may be performed first to design the semiconductor device, and then step S1200 may be performed later to design an interposer for implementing the high speed channel. In other example embodiments, when the semiconductor package has the 3D structure such as the semiconductor package 500 of FIG. 10, steps S1100 and S1200 may be substantially simultaneously or concurrently performed to design the semiconductor device and the high speed channel at the same time or at once.

The designed high speed channel may be modeled (step S1300), and a result of modeling the high speed channel may be analyzed and verified (step S1400). The modeling operation in step S1300 may be performed based on the method of modeling the high speed channel according to example embodiments described with reference to FIGS. 1 through 10.

When operations of analyzing and verifying the result of modeling the high speed channel are successful (step S1400: YES), e.g., when it is determined based on a result of the analysis that the characteristic of the high speed channel satisfies a predetermined signal characteristic, an operation of designing the semiconductor package may be completed.

When the operations of analyzing and verifying the result of modeling the high speed channel fail (step S1400: NO), e.g., when it is determined based on the result of the analysis that the characteristic of the high speed channel does not satisfy the predetermined signal characteristic, a design of the semiconductor package may be changed (step S1500), and steps S1300 and S1400 may be performed again based on a result of changing the design. In some example embodiments, an operation of changing the design in step S1500 may include only an operation of changing a design of the semiconductor device, which is similar to step S1100, or may include only an operation of changing a design of the high speed channel, which is similar to step S1200, or may include both the operation of changing the design of the semiconductor device and the operation of changing the design of the high speed channel.

In some example embodiments, when the design of the semiconductor package is changed, a design condition for the semiconductor device and/or the high speed channel may be changed. For example, the semiconductor device and/or the high speed channel may be re-designed to change a circuit configuration, a layout, and/or another characteristic. In other example embodiments, when the design of the semiconductor package is changed, a process or a process condition used for manufacturing the semiconductor device and/or the high speed channel may be changed. For example, process equipments, process orders, various parameters in process, etc., may be tuned. In still other example embodiments, when the design of the semiconductor package is changed, a product specification for the semiconductor device and/or the high speed channel may be changed. According to example embodiments, at least two of the design condition, the process condition, and the product specification may be simultaneously or concurrently changed.

Figure 13:
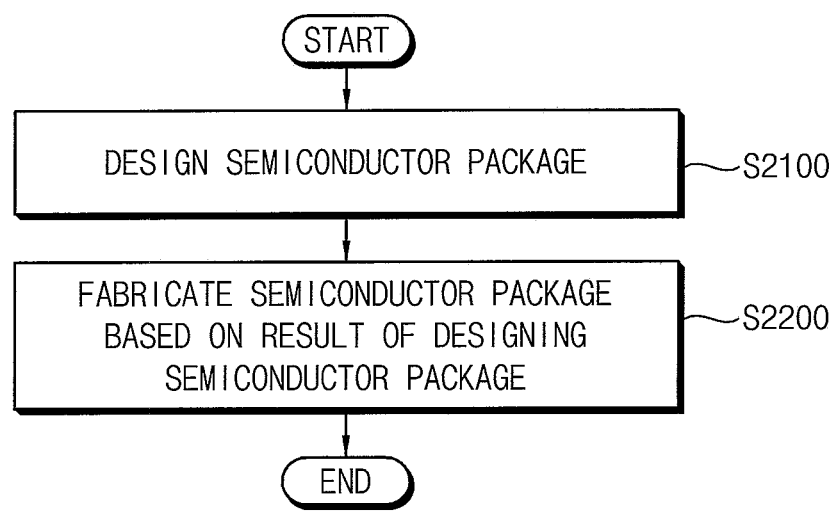
FIG. 13 is a flowchart illustrating a method of manufacturing a semiconductor package according to example embodiments of the inventive concepts.

FIG. 13 is a flowchart illustrating a method of manufacturing a semiconductor package according to example embodiments.

Referring to FIG. 13, in a method of manufacturing a semiconductor package according to example embodiments of the inventive concepts, a semiconductor package including at least one semiconductor device and a high speed channel is designed (step S2100), and the semiconductor package is fabricated based on a result of designing the semiconductor package (step S2200). The designing operation in step S2100 may be performed based on the method of designing the semiconductor package according to example embodiments described with reference to FIG. 12.

As will be appreciated by those skilled in the art, the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

The inventive concepts may be applied to various devices and/or systems including the semiconductor packages. For example, the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of modeling a high speed channel in a semiconductor package, the high speed channel comprising a plurality of first connection wirings on an upper surface of a semiconductor substrate and a plurality of through electrodes that extend within the semiconductor substrate, the method comprising:
    receiving design information of the high speed channel;
    dividing the design information into a first layout comprising the plurality of first connection wirings and a second layout comprising the plurality of through electrodes;
    performing a first modeling operation on the first layout using a first modeling scheme and a first modeling tool;
    performing a second modeling operation on the second layout using a second modeling scheme, a second modeling tool, and at least a portion of the first layout, wherein the second modeling scheme is different from the first modeling scheme, and wherein the second modeling tool is different from the first modeling tool; and
    obtaining an integrated modeling result of an entirety of the high speed channel by combining a result of the first modeling operation and a result of the second modeling operation.

2. The method of claim 1, wherein performing the first modeling operation on the first layout comprises:
    setting a material of the plurality of first connection wirings to a first material;
    performing a corner-aware parameter extraction flow based on the plurality of first connection wirings set to the first material and a structure of the plurality of first connection wirings;
    obtaining a first resistance as a result of the corner-aware parameter extraction flow; and
    obtaining a first S-parameter for the plurality of first connection wirings based on the first resistance.

3. The method of claim 2, wherein the first modeling tool is an on-chip tool, and
    wherein the first modeling scheme is a parameter extraction scheme using the on-chip tool.

4. The method of claim 2, wherein the first material is copper.

5. The method of claim 2, wherein the first S-parameter is obtained by converting the first resistance using an additional tool that is different from the first modeling tool and the second modeling tool.

6. The method of claim 2, wherein performing the second modeling operation on the second layout comprises:
    forming at least one integrated connection wiring using some of the plurality of first connection wirings;
    performing a coupling-aware full wave three-dimensional (3D) electromagnetic flow based on the at least one integrated connection wiring and a structure of the plurality of through electrodes;
    obtaining a second resistance, a first inductance, a first capacitance, and a first conductance as a result of the coupling-aware full wave 3D electromagnetic flow; and obtaining a second S-parameter for the plurality of through electrodes based on the second resistance, the first inductance, the first capacitance, and the first conductance.

7. The method of claim 6, wherein the second layout further comprises a plurality of second connection wirings on a lower surface of the semiconductor substrate and a plurality of solder bumps under the plurality of second connection wirings,
wherein the coupling-aware full wave 3D electromagnetic flow is performed by applying structures of the plurality of second connection wirings and the plurality of solder bumps together, and
wherein the second S-parameter represents an S-parameter for the plurality of through electrodes, the plurality of second connection wirings, and the plurality of solder bumps.

8. The method of claim 6, wherein forming the at least one integrated connection wiring comprises:
selecting a subset of the plurality of first connection wirings that are closest to the plurality of through electrodes;
setting the material of the subset of the plurality of first connection wirings to a second material that is different from the first material; and
obtaining the at least one integrated connection wiring by filling at least a portion of empty regions between respective ones of the subset of the plurality of first connection wirings with the second material.

9. The method of claim 8, wherein, in a plan view, a first through electrode of the plurality of through electrodes overlaps two or more of the subset of the plurality of first connection wirings, and
wherein the at least one integrated connection wiring is formed such that the first through electrode overlaps the at least one integrated connection wiring.

10. The method of claim 8, wherein, in a plan view, a first through electrode of the plurality of through electrodes overlaps two or more of the subset of the plurality of first connection wirings, and
wherein the at least one integrated connection wiring is formed such that the first through electrode and a second through electrode of the plurality of through electrodes overlap the at least one integrated connection wiring.

11. The method of claim 8, wherein the second material is a perfect conductor (PEC) that has a resistance of about zero.

12. The method of claim 6, wherein the second modeling tool is an off-chip tool, and
wherein the second modeling scheme is a full wave 3D electromagnetic scheme that is configured to use the off-chip tool.

13. The method of claim 6, wherein the second S-parameter is obtained directly from the second modeling tool without using an additional tool.

14. The method of claim 6, wherein obtaining the integrated modeling result of the entirety of the high speed channel comprises:
obtaining an integrated S-parameter by combining the first S-parameter and the second S-parameter.

15. The method of claim 1, wherein the semiconductor package comprises:
a package substrate;
an interposer on the package substrate;
a first semiconductor device on the interposer; and
a second semiconductor device on the interposer, the second semiconductor device being a semiconductor device of a different type from the first semiconductor device,
wherein the semiconductor substrate, the plurality of first connection wirings, and the plurality of through electrodes are included in the interposer.

16. The method of claim 15, wherein the first semiconductor device comprises a logic semiconductor device, and
wherein the second semiconductor device comprises a memory device.

17. The method of claim 1, wherein the semiconductor package comprises:
a package substrate;
a first semiconductor device on the package substrate; and
a second semiconductor device on the first semiconductor device, the second semiconductor device being a semiconductor device of a different type from the first semiconductor device,
wherein the semiconductor substrate and the plurality of first connection wirings are included in the first semiconductor device, and
wherein the plurality of through electrodes are included in at least one of the first semiconductor device and the second semiconductor device.

18. A method of designing a semiconductor package, the method comprising:
generating a design of at least one semiconductor device that is included in the semiconductor package;
generating a design of a high speed channel that is included in the semiconductor package;
modeling the high speed channel; and
analyzing and verifying a result of the modeling of the high speed channel,
wherein the high speed channel comprises a plurality of first connection wirings on an upper surface of a semiconductor substrate and a plurality of through electrodes penetrating the semiconductor substrate,
wherein modeling the high speed channel comprises:
receiving design information of the high speed channel;
dividing the design information into a first layout comprising the plurality of first connection wirings and a second layout comprising the plurality of through electrodes;
performing a first modeling operation on the first layout using a first modeling scheme and a first modeling tool;
performing a second modeling operation on the second layout using a second modeling scheme, a second modeling tool, and at least a portion of the first layout, wherein the second modeling scheme is different from the first modeling scheme, and wherein the second modeling tool is different from the first modeling tool; and
obtaining an integrated modeling result of an entirety of the high speed channel by combining a result of the first modeling operation and a result of the second modeling operation,
wherein, in response to determining that the high speed channel does not satisfy a predetermined characteristic based on the analyzing and verifying the result of the modeling of the high speed channel, an operation of changing the design of the at least one semiconductor device and/or the design of the high speed channel is performed on the semiconductor package.

19. A method of manufacturing a semiconductor package, the method comprising:

generating a design of a semiconductor package comprising at least one semiconductor device and a high speed channel; and fabricating the semiconductor package based on a result of designing the semiconductor package, wherein designing the semiconductor package comprises:

generating a design of the at least one semiconductor device;

generating a design of the high speed channel;

modeling the high speed channel; and analyzing and verifying a result of the modeling of the high speed channel, wherein the high speed channel comprises a plurality of first connection wirings on an upper surface of a semiconductor substrate and a plurality of through electrodes that extend within the semiconductor substrate, wherein modeling the high speed channel comprises:

receiving design information of the high speed channel;

dividing the design information into a first layout comprising the plurality of first connection wirings and a second layout comprising the plurality of through electrodes;

performing a first modeling operation on the first layout using a first modeling scheme and a first modeling tool;

performing a second modeling operation on the second layout using a second modeling scheme, a second modeling tool, and at least a portion of the first layout, wherein the second modeling scheme is different from the first modeling scheme, and wherein the second modeling tool is different from the first modeling tool; and obtaining an integrated modeling result of an entirety of the high speed channel by combining a result of the first modeling operation and a result of the second modeling operation.

20. The method of claim 1, wherein at least one of the plurality of through electrodes is a through silicon via (TSV).

* * * * *